(12) United States Patent
Kapchie et al.

(10) Patent No.: US 10,448,654 B2
(45) Date of Patent: Oct. 22, 2019

(54) PACKAGED AMBIENT DAIRY BEVERAGE

(71) Applicant: NESTEC S.A., Vevey (CH)

(72) Inventors: Virginie Kapchie, Dublin, OH (US);
Veena Prabhakar, Dublin, OH (US);
Philippe Rousset, Dublin, OH (US);
Alexander A. Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 126 days.

(21) Appl. No.: 15/522,485

(22) PCT Filed: Oct. 30, 2015

(86) PCT No.: PCT/EP2015/075229
§ 371 (c)(1),
(2) Date: Apr. 27, 2017

(87) PCT Pub. No.: WO2016/066788
PCT Pub. Date: May 6, 2016

(65) Prior Publication Data
US 2017/0332651 A1  Nov. 23, 2017

Related U.S. Application Data

(60) Provisional application No. 62/072,592, filed on Oct. 30, 2014.

(51) Int. Cl.
| | | |
|---|---|---|
| A23C 3/00 | (2006.01) |
| A23C 9/152 | (2006.01) |
| A23C 9/154 | (2006.01) |
| A23P 30/40 | (2016.01) |
| A23C 9/156 | (2006.01) |

(52) U.S. Cl.
CPC .............. *A23C 3/005* (2013.01); *A23C 9/154* (2013.01); *A23C 9/156* (2013.01); *A23C 9/1522* (2013.01); *A23C 9/1524* (2013.01); *A23P 30/40* (2016.08); *A23C 2210/30* (2013.01)

(58) Field of Classification Search
CPC ..... A23C 3/005; A23C 9/1522; A23C 9/1524; A23C 9/154; A23C 9/156; A23P 30/40
See application file for complete search history.

(56) References Cited

U.S. PATENT DOCUMENTS

| | | |
|---|---|---|
| 3,084,052 A | 4/1963 | McLaughlin |
| 5,196,220 A | 3/1993 | Clare et al. |
| 2003/0077371 A1 | 4/2003 | Asano et al. |

OTHER PUBLICATIONS

Igoe, Dictionary of Food Ingredients, Fifth Edition, Carboxymethylcellulose, Springer, New York, 2011.*
Agave Nectar, Popular Science, [on line] Jan. 20, 2019, retrieved Jan. 24, 2019. Retrieved from the Internet: URL:<https://www.popsci.com/diy/article/2009-01/agave-nectar-sweetener-any-occasion>.*
Mintel Mocha Flavored Breakfast Shake printed from the Internet at http://www.gnpd.com, 2 pages, XP002751895.

* cited by examiner

*Primary Examiner* — Viren A Thakur
*Assistant Examiner* — C A Smith
(74) *Attorney, Agent, or Firm* — K&L Gates LLP

(57) ABSTRACT

A packaged product consisting essentially of an aseptic dairy beverage in a closed container is disclosed. The beverage may be foamed by shaking, to provide a pleasant foamy texture.

16 Claims, 3 Drawing Sheets

PACKAGED AMBIENT DAIRY BEVERAGE

CROSS REFERENCE TO RELATED APPLICATIONS

The present application is a National Stage of International Application No. PCT/EP2015/075229, filed on Oct. 30, 2015, which claims priority to U.S. Provisional Patent Application No. 62/072,592, filed on Oct. 30, 2014, the entire contents of which are being incorporated herein by reference.

TECHNICAL FIELD

The invention relates to a packaged dairy beverage, specifically an ambient dairy beverage which may exhibit a stable and smooth foam after shaking by hand.

BACKGROUND OF THE INVENTION

Any discussion of the prior art in the specification should in no way be considered as an admission that such prior art is widely known or forms part of common general knowledge in the field.

Milk-based beverages are popular drinks amongst the consumers, because they are viewed as healthier alternatives to sparkling sodas, with nutritious properties thanks to their protein and minerals contents, and with a good acceptance by consumers who find water too bland.

Foamy beverages are appreciated for their light and refreshing texture. However, this depends strongly on the foam properties, such as bubble size and distribution, origin of the bubbles, for instance by gasification with carbonic gas, or by fermentation with yeasts which generate carbonic gas.

Over the recent years, the applicant has filed several patent applications relating to ready-to-drink dairy-based beverage which are shelf-stable at ambient temperatures, for instance during 3 months at temperatures ranging from 15° C. to 35° C. In order to avoid biological spoilage, such beverages undergo heat treatments which have a strong impact on stability, and may provoke gelation, syneresis and other undesirable physical evolution over shelf life. Specific stabiliser systems have been developed in order to avoid or mitigate such physical evolution. These beverages are not foamy.

Experience shows that usually, the stabiliser systems used to reach a required shelf-life after a specific heat-treatment depends on the recipe of the ready-to-drink dairy-based beverage, such as macronutrient content (e.g. protein, carbohydrate, lipids), total solids, pH, or micronutrient content (vitamins and minerals in particular).

The inventors have found that there exist several coffee-flavoured milk beverages. However, these beverages have either a very watery mouth-feel, or have a very thick texture. Watery beverages do not bring the satisfaction of a milk drink, while thick beverages are not perceived as very refreshing or as thirst quenching.

NESCAFE SHAKISSIMO was successfully launched in Europe. This product is a chilled dairy product with a good foamability upon shaking by hand. However, it has a short shelf-life of about a month at chilled temperatures. There are several shortcomings to this, including the need to maintain the cold distribution chain at all times, including during transportation and storage. It cannot be stored at ambient temperatures for an extended time.

US 2007/0178213 A1 relates to a stirred-style aerated yogurt which can be consumed as a flowable beverage. An aerating gas, nitrogen, is integrated in the product. U.S. Pat. No. 4,374,155 relates to a drinkable yogurt and milk preparation.

The inventors have found it desirable to overcome or ameliorate at least one of the disadvantages of the prior art, or to provide a useful alternative. In particular, the inventors have set themselves to create a dairy-based product which is shelf-stable under ambient conditions and which can provide a pleasant foamy beverage upon shaking.

SUMMARY OF THE INVENTION

To this end, a first embodiment of the invention proposes a packaged product consisting essentially of an aseptic dairy beverage in a closed container, wherein said beverage comprises from 2 to 4 wt % of milk proteins, up to 4 wt % of milk fat, from 0.5 to 5 wt % of added sugar, from 0.35 to 0.65 wt % of cellulose, from 0.05 to 0.18 wt % of gellan gum, and the remainder to 100 wt % of water; wherein said beverage has an apparent viscosity of 30 to 80 mPa·s at 4° C.); the headspace represents from 18 to 35 vol. % of the volume of the container, and wherein said beverage has a shelf life of at least 6 months at 20° C.

In a second embodiment, the invention proposes a process for preparing a foamy aseptic dairy beverage which comprises the step of 1) providing a packaged product according to the first embodiment of the invention, wherein said packaged product is optionally refrigerated, then 2) shaking said packaged product to obtain said foamy dairy beverage.

In a third embodiment, the invention proposes the use of a packaged product according to the first embodiment of the invention, for preparing a foamy aseptic dairy beverage by shaking, wherein said packaged product consists essentially of a dairy beverage in a closed container.

These and other aspects, features and advantages of the invention will become more apparent to those skilled in the art from the detailed description of embodiments of the invention, in connection with the attached drawings.

BRIEF DESCRIPTION OF THE DRAWINGS

(FIG. 3) and at 20° C.
(FIG. 4).

DETAILED DESCRIPTION OF THE INVENTION

As used in the specification, the word "comprising" is to be construed in an inclusive sense, that is to say, in the sense of "including, but not limited to", or "containing, but not limited to", as opposed to an exclusive or exhaustive sense. On the contrary, the words "consisting of" are to be construed in an exclusive sense, that is to say in the sense of "limited to" except for impurities ordinarily associated with an ingredient for instance. The words "consisting essentially of" limit the scope of a claim to the specified materials or steps, and those that do not materially affect the basic and novel characteristic(s)" of the claimed invention.

As used in the specification, the word "about" should be understood to apply to each bound in a range of numerals. Moreover, all numerical ranges should be understood to include each whole integer within the range.

As used in the specification, the singular forms "a", "an", and "the" include plural referents unless the context clearly dictates otherwise.

Unless noted otherwise, all percentages in the specification refer to weight percent (noted wt %).

Unless defined otherwise, all technical and scientific terms have and should be given the same meaning as commonly understood by one of ordinary skill in the art to which this invention belongs, that of aseptic dairy beverages.

Figure 1:
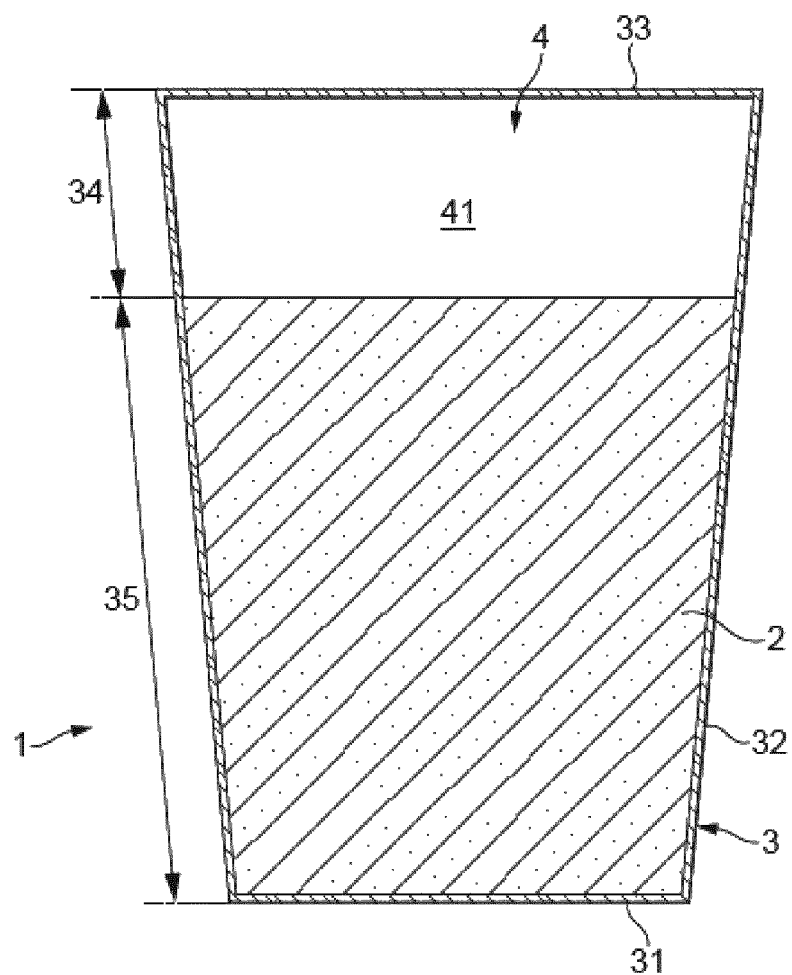
FIG. 1 shows a dairy beverage in a closed cup.
Figure 2:
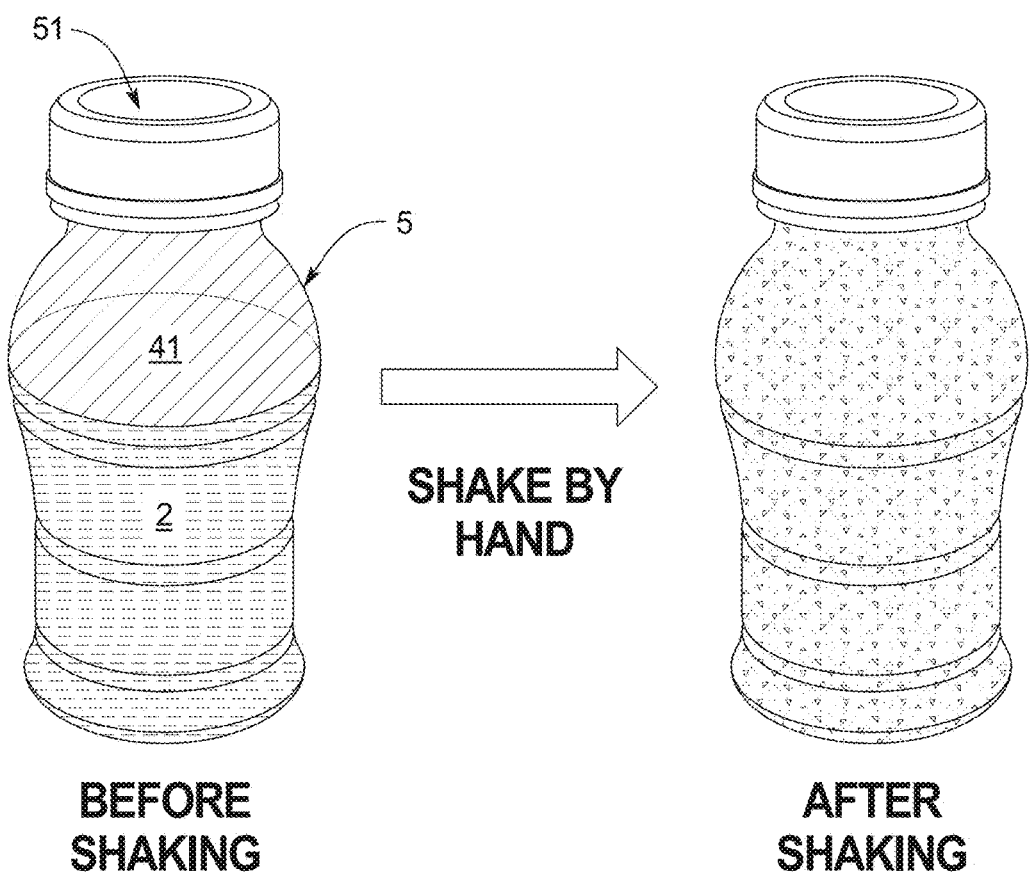
FIG. 2 shows a dairy beverage in a bottle, before and after shaking.

As shown on FIGS. 1 and 2, an embodiment of the invention relates to a packaged product 1 which consists essentially of a dairy beverage 2 in a closed container, such as a cup 3 or a bottle 5. The volume of the container 3, 5 is split between the beverage 2 and a headspace 4. The beverage is suitable for preparing a foamy beverage by shaking it in the closed container. The consumer can then open the container to drink the foamy beverage directly from it. The consumer can also pour the foamy beverage from a bottle 5 into a cup, for consumption.

Throughout the specification, an "aseptic beverage" refers to a beverage which is filled under aseptic conditions into a container. "Shelf life" refers to the period of time after production of the beverage, during which the beverage is transported, and stored in retailers' or consumers' shelves, before consumption. The aseptic beverage has a shelf life of at least 6 months at ambient temperature. "Ambient temperature" ranges from 15° C. to 38° C. Preferably, the aseptic beverage has a shelf life of at least at least 2 months at 38° C., or 4 months at 30° C., or 6 months at 20° C.

The aseptic beverage comprises a dairy component, a flavour component, a texture component, and water.

The dairy component provides the nutritional benefits of milk. The dairy component can include one or more dairy ingredients or dairy substitute ingredients. For example, the dairy ingredients can be milk, milk fat, milk powder, skim milk, milk proteins, cream, and combinations thereof. Examples of suitable milk proteins are casein, caseinate, casein hydrolysate, whey, whey hydrolysate, whey concentrate, whey isolate, milk protein concentrate, milk protein isolate, and combinations thereof. Furthermore, the milk protein may be, for example, sweet whey, acid whey, α-lactalbumin, β-lactoglobulin, bovine serum albumin, acid casein, caseinates, α-casein, β-casein and/or γ-casein. Suitable dairy substitute ingredients include soy proteins, rice proteins and combinations thereof, for example. In a preferred embodiment, the beverage does not contain dairy substitute ingredients. In an embodiment, the beverage comprises at least one of skim milk, whole pasteurized milk, skim milk powder, and cream. Preferably, the beverage comprises skim milk, cream and skim milk powder. In a preferred embodiment, the beverage does not contain added oil. Preferably, the dairy component does not contain fermented milk.

In an embodiment, the beverage comprises less than 4 wt % of milk fat, such as from 0.5 to 3.8 wt % of milk fat, preferably from 0.8 to 3.54 wt % of milk fat, such as 1 wt %, 1.5 wt %, 2.5 wt %, or 3.5 wt % of milk fat. In an embodiment, the fat content of the beverage is low enough so that the beverage could be considered as a skim milk beverage.

In an embodiment, the beverage comprises from 2 to 4 wt % of milk proteins, preferably from 2 to 3.9 wt % of milk proteins, and more preferably from 2 to 3 wt % of milk proteins, such as 2 wt %, 2.5 wt %, 2.8 wt %, 3.5 wt %, or 3.9 wt % of milk protein. Milk proteins have an impact on foamability and foam stability.

The flavour component provides flavour to the beverage, in addition to the milk flavour which comes from the dairy component. The flavour component comprises a sweetener, such as sugar (sucrose) or a non-caloric sweetener. For instance, the beverage comprises from 0.5 to 5 wt % of sugar. In an embodiment, the beverage has a "low sugar" content, meaning that it contains less than 4.5 g of added sugar per 100 g of the beverage. "Added sugar" refers to caloric mono- and di-saccharides added during manufacture of the beverage, such as glucose, sucrose, maltose, fructose, which are not naturally found in the dairy component. For instance, lactose is naturally found in milk, therefore, for the purpose of this disclosure, lactose is not taken into account in "added sugar".

In addition to the sweetener, the flavour component comprises a flavour ingredient selected from coffee, cocoa, tea, caramel, vanilla, cinnamon, cardamom, saffron, clove, and mixtures thereof. In a preferred embodiment, the beverage comprises a coffee component, such as coffee extract. Coffee extract may be provided as liquid or viscous coffee concentrate, or as instant powdered coffee, such as spray-dried powdered coffee or freeze-dried powdered coffee. Preferably, the beverage comprises from 0.5 to 1.5 wt % of coffee component, such as soluble powdered coffee.

The texture component provides mouth-feel and viscosity, contributes to shelf-stability of the product at refrigeration and ambient temperatures, and helps maintaining the foamy texture of the beverage after shaking. The texture component reduces physical instability issues while providing a pleasant foamy mouthfeel after shaking. The texture component comprises cellulose and gellan gum in specific concentrations. More specifically, the beverage comprises from 0.35 to 0.65 wt % of cellulose, and from 0.05 to 0.18 wt % of gellan gum.

The beverage has an apparent viscosity of 30 to 80 mPa·s at 4° C. The measurements were conducted with a Physica MCR 501 rheometer (Anton Paar GmbH, Austria), using a double-gap geometry (DG26.7). Apparent viscosity was measured from 4° to 40° C. and then from 40° to 4° C. at a constant shear rate=75 $s^{-1}$ and a heating/cooling rate=2° C./min.

In an embodiment, the beverage further comprises buffering agent. The buffering agent can be, for example, monophosphates, diphosphates, sodium mono- and bicarbonates, potassium mono- and bicarbonates or a combination thereof. More specifically, non-limiting examples of suitable buffers are salts such as potassium phosphate, potassium phosphate, potassium bicarbonate, potassium citrate, sodium bicarbonate, sodium citrate, sodium phosphate, disodium phosphate. Preferably, the buffering agent represents from about 0.03 to about 0.1% of the total weight of the product.

In an embodiment, the aseptic dairy beverage contains from 14 to 25 wt % of total solids, preferably from 18 to 20 wt % total solids. The total solids content is involved in the overall mouth feel and viscosity of the beverage.

The aseptic dairy beverage is manufactured by providing a standardised liquid milk composition, which comprises up to 4 wt % of milk fat, and from 2 to 4 wt % of milk proteins. The mix composition may be prepared by mixing liquid skim milk, milk cream and skimmed milk powder. Flavour components, such as sugar and a coffee component, and texture component, are also mixed into the liquid mix composition. For instance, mixing is done at 10° C., during 60 minutes. Then, the pH of the mix may be adjusted with a buffering agent, such as sodium bicarbonate and dipotassium phosphate. The pH is adjusted to a value of 6.4 to 7.0. The liquid milk composition is then pre-heated prior to sterilisation typically at 141-143° C. for 5 seconds. Sterilisation removes biological contamination from the milk composition. Alternative heat-treatments are known to the person of ordinary skill in the art. Then the sterilised liquid milk composition is cooled to about 75° C. prior to homogenisation under a typical pressure of 150 bar in a conventional homogeniser. Homogenisation further disperses the fat component and other ingredients. Then the milk composition is cooled to refrigerated temperatures, and filled into a container, such as a cup or a bottle. Filling is done under aseptic conditions. In an embodiment, filling is performed under a controlled atmosphere, to flush oxygen out of the headspace. For instance, controlled atmosphere is a nitrogen atmosphere. The container is then sealed. When the container is a bottle, sealing can be done with a standard screw lid 51. When the container is a cup, sealing can be done with a standard foil seal.

Usually, maintaining a foamed texture over shelf life requires the use of relatively high amounts of additives to stabilise the foam. However, additives are not always accepted by consumers. Also, the mouth-feel of shelf-stable foamed beverage may be less pleasant than that of a freshly prepared foamy beverage. Rather than ensuring that the beverage retains a foamy texture over the whole shelf life, the inventors have reversed the problem and now provide a non-foamy beverage which retains a pleasant foamy texture during consumption. As mentioned, the foamy texture is obtained by shaking the beverage in its closed container, for instance by hand. Shaking by hand may be done by holding the container in the hand, and bending and stretching the arms several times, for instance from 3 to 15 times. Generally, about 5 to 10 movements are sufficient to generate a pleasant foamy texture in the beverage. As shown on FIG. 3, the beverage retains a pleasant foam up to 10 minutes after shaking of the refrigerated beverage at 4° C. As shown on FIG. 3, the beverage also retains a pleasant foam up to 5 minutes after shaking of the refrigerated beverage at ambient temperature of 20° C.

An advantage is that it is not necessary to worry about shelf stability of the foam. Only the shelf stability of the non-foamy beverage is a concern. In an embodiment, the beverage is shelf-stable during 6 months at 20° C., more preferably during 9 months at 20° C. In another embodiment, the beverage is shelf-stable during 6 months at 20° C., 4 months at 30° C. or 2 months at 38° C. A relatively long shelf stability may be achieved thanks to the aseptic manufacturing conditions, together with sterilisation, of the beverage.

The cup 3 has a bottom wall 31, a side wall 32, and a lid 33. Shaking the beverage disperses the headspace gas 41 as bubbles into the beverage 2. The composition of the beverage, in particular the selection of hydrocolloids, was developed so that the bubbles remain distributed in the whole volume of the beverage during consumption, and to provide a pleasant mouth-feel. The fact that the bubbles are distributed in the whole volume of the beverage provides a pleasant foamy texture. For instance, the refrigerated beverage retains a foamy texture during at least 10 minutes after shaking. Assessment of the foamy texture is performed by a trained sensory panel, as explained in the examples below. The maximum period during which bubbles are retained in the beverage is not absolutely critical, as the main criteria is that there are bubbles in the product until the consumer has completely drunk the beverage. Ordinarily, such beverages are consumed in less than 30 minutes. Preferably, the beverage retains a foamy texture during at least 15, 20, 25, or 30 minutes. The bubble distribution is not necessarily homogeneous throughout the whole volume of the beverage. Especially, due to coalescence and buoyancy of the bubbles, there may be more and bigger bubbles close to the surface of the beverage than at the bottom of the cup.

The inventors have found that if the headspace 4 is too small, then the closed container 3, 5 does not contain enough gas 41 to provide a pleasant foamy texture upon shaking. For instance, it was found that a headspace of 15 vol. % was too low to provide a pleasant foamy texture after shaking. Therefore, the headspace 4 represents preferably at least 18% by volume (vol. %) of the volume of the container.

On the other hand, if the headspace 4 is too large, it may have several undesirable consequences. First, the consumer could consider that the container is not filled enough. Second, a large headspace can only be provided with a large container. This increases the cost of packaging and the amount of waste. Third, the inventors have found that if the headspace is too large, then the container tends to squash itself over shelf life. Without willing to be bound by theory, the inventors believe this is due to oxygen consumption. During shelf life, the oxygen in the headspace reacts with the beverage, especially when the beverage comprises a coffee component. This reduces the internal pressure in the headspace, thereby provoking a "vacuum" effect. For instance, containers with a headspace of above 35° vol. % showed an unacceptable vacuum effect and squashing over shelf life. This could be solved by flushing the headspace with nitrogen for instance, during filling and sealing of the container. However, this is an expensive technology. It was found that a good balance is achieved between these undesirable consequences, industrialisation considerations and the need to provide sufficient gas for foaming when the headspace represents up to 35 vol. % of the volume of the container.

In an embodiment, the headspace represents from 18 to 35 vol. % of the volume of the container. In other words, if the container has a volume of 100 mL, then the headspace represents from 18 mL to 35 mL, and the remainder is the beverage (65 mL to 82 mL). Preferably, the headspace represents from 20 to 32 vol. % of the volume of the container, more preferably, from 30 to 32 vol. % of the volume of the container.

When the container is a cup, it may be desirable that the thickness of the side wall 32 of the cup 3 be greater in the upper or top part 34 of the cup 3—where the headspace 4 is located—than in the lower or bottom part 35 of the cup 3—where the beverage 2 is located—to strengthen the cup 3 against the vacuum effect. This also makes the cup easier to hold and shake, thanks to a greater resistance to squeezing by hand.

In an embodiment, the height of the cup 3 ranges from 90 to 150 mm and the volume of the cup ranges from 100 to 300 mL. The cup 3 contains one serving of the beverage 2. For instance, one serving of beverage represents from 80 to 220 mL of beverage before shaking.

When the container is a PET bottle, it may be desirable to provide it common strengthening features, such as ribs.

In an embodiment, the bottle has a volume of 240 ml. Preferably, the bottle 5 contains one serving of the beverage 2. For instance, one serving represents from about 150 to 180 mL of beverage before shaking.

In another embodiment, the invention relates to a process for preparing a foamy aseptic dairy beverage which comprises the steps of providing a packaged product as described above, then shaking the packaged product to obtain a foamy dairy beverage. Optionally, the packaged product may be refrigerated prior to shaking, so that the foamy beverage is chilled for consumption. The foamy beverage is then ready for consumption.

As already mentioned, the beverage is shelf-stable at ambient temperatures. An advantage is that the packaged product may be stored at ambient temperatures, in warehouses, in shops or at home by consumers. In shops, a few containers can be stored in refrigerators for on-the-go consumption, so that the consumer can directly prepare a refrigerated foamy beverage. At home, consumers can keep the packaged product at ambient temperature and store a few containers in their refrigerator for consumption in the day for instance. This saves room in the refrigerator.

As mentioned, the foamy texture is obtained by shaking the beverage in the closed container, for instance by hand. Shaking by hand may be done by holding the container in the hand, and bending and stretching the arms several times, for instance from 3 to 15 times. Generally, about 5 to 10 movements are sufficient to generate a pleasant foamy texture in the beverage. When preparing the foamy beverage in that manner, to percent of air incorporated of 7 and 20% can be achieved, usually of about 15 to 18%.

The percent of incorporated air is measured as follows: a volume V of the beverage is measured before shaking ($V_o$). The product is shaken 10 times by hand. The volume V of the shaken beverage with air is also measured ($V_f$). The percent of incorporated air (in %) is the result of following equation:

$$\text{Air incorporated} = \frac{V_f - V_o}{V_f} \times 100$$

where:
$V_o$=initial volume of beverage (non-aerated beverage)
$V_f$=final volume of shaken beverage (aerated beverage)

EXAMPLES

Example 1

Several dairy beverages were prepared by mixing liquid milk or water, with sugar and other flavour ingredients, the other milk based ingredients, the texture components (cellulose and gellan gum) and a buffering agent. The mix was then pre-heated to 75° C., then sterilised at 143° C. during 5 seconds, then cooled to 75° C. prior to homogenisation under 150 bars. Then the liquid beverage was cooled to about 10° C., then aseptically filled into 8 oz (about 236 mL) bottles (R100, R70 and R50). The bottles have a total volume of 8 oz (236 mL), and they are filled with 180 mL of dairy beverage. This leaves a headspace of about 60 mL, which corresponds to about 31 vol. %. The manufacture of the liquid dairy beverage was done under aseptic conditions, at atmospheric pressure.

The composition of the products is shown in the table below:

| Ingredient | Unit | REF | R100 | R70 | R50 |
| --- | --- | --- | --- | --- | --- |
| Liquid skim milk | wt % | to 100% | — | — | — |
| Liquid whole milk | wt % | — | 86 | 60 | 43 |
| Cream (34% fat) | wt % | 7.90 | — | — | — |
| Skimmed milk powder | wt % | 3.10 | 3.1 | 3.1 | 3.1 |
| Sugar | wt % | 5 | 5 | 5 | 5 |
| Coffee extract | wt % | 1 | 1 | 1 | 1 |
| Cocoa powder | wt % | 0.20 | 0.2 | 0.2 | 0.2 |
| Cellulose | wt % | 0 | 0.5 | 0.5 | 0.5 |
| Cellulose and carrageenan blend | wt % | 0.55 | — | — | — |
| Gellan gum | wt % | — | 0.1 | 0.1 | 0.1 |
| Xanthan gum | wt % | 0.1 | — | — | — |
| Sodium bicarbonate | wt % | — | 0.06 | 0.06 | 0.06 |
| Dipotassium phosphate | wt % | — | 0.02 | 0.02 | 0.02 |
| NaOH (30% solution) | wt % | 0.08 | — | — | — |
| Water | wt % | — | to 100% | to 100% | to 100% |

The cellulose and carrageenan blend is AVICEL PLUS CM2159. The xanthan gum is SATIAXANE CX91.

The beverage analysis is shown below:

| | Unit | REF | R100 | R70 | R50 |
| --- | --- | --- | --- | --- | --- |
| Total solids | wt % | 20.6 | 20 | 17 | 15 |
| Milk fat | wt % | 3.2 | 3.1 | 2.2 | 1.55 |
| Milk protein | wt % | 3.9 | 3.9 | 3 | 2.5 |
| Viscosity * | mPa · s | 60 | 60 | 50 | 42 |

* viscosity was measured at the beginning of shelf life. It was measured as explained in the specification above. It was observed that the viscosity of the beverages increases slightly over shelf life, to a maximum of 80 mPa · s No squashing of the bottles was observed during shelf life, ie during up to 6 months at 20° C.

Example 2

The beverages R100, R70 and R50 of example 1 were compared with commercial chilled dairy beverages flavoured with coffee NESCAFE SHAKISSIMO CAPPUCCINO (REF). The comparison consisted in shaking the closed bottle or cup 10 times, then tasting the shaken beverages to assess the mouthfeel and the stability of the foam. This is shown on FIG. 2 for instance. The assessment was performed by a panel of trained people for texture assessment. The beverages were tasted immediately after shaking and every five minutes afterwards, for an overall period of 30 minutes.

Figure 3A:
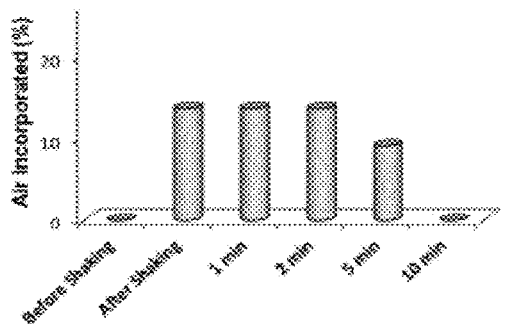
FIGS. 3 and 4 show the incorporated air and foam stability of the reference product NESCAFE SHAKISSIMO CAPPUCCINO (FIGS. 3A and 4A) and of a product according to the invention (FIGS. 3B and 4B) when the product is shaken at 4° C.
Figure 3B:
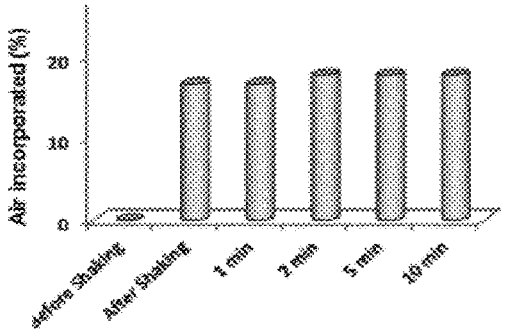
Figure 4A:
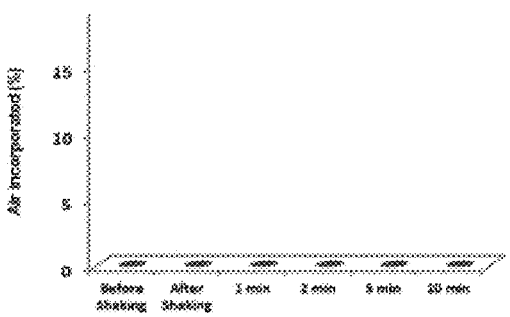
Figure 4B:
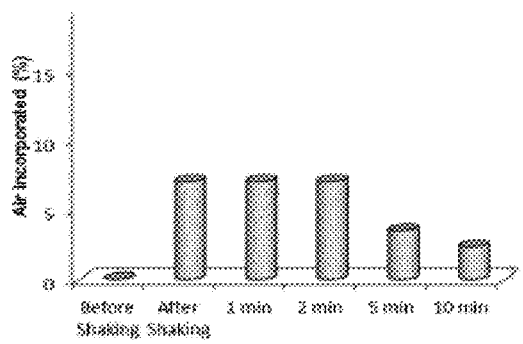

As shown on FIG. 3., when refrigerated at 4° C., the beverages of example 1 retained a pleasant foamy texture up to 10 minutes after shaking, whereas the foam of the reference product did not remain as stable for more than 5 minutes. As shown on FIG. 4, when the beverage was at ambient temperature, i.e. about 20° C., it was still possible to obtain a foamy beverage after shaking, for up to 5 minutes, with beverages R100, R70 and R50. However, it was not possible to provide a pleasant foamy beverage with the reference product at 20° C.

The amount of air incorporated in the shaken beverages was also measured. Immediately after shaking, the beverages of example 1 exhibited about 20% of incorporated air.

In conclusion, it was agreed that the beverages R100, R70 and R50 of example 1 have a pleasant foamy texture after shaking, which is retained during at least 10 minutes.

Although preferred embodiments have been disclosed in the description with reference to specific examples, it will be recognised that the invention is not limited to the preferred embodiments. Various modifications may become apparent to those of ordinary skill in the art and may be acquired from practice of the invention. It will be understood that the materials used and the chemical details may be slightly different or modified from the descriptions without departing from the methods and compositions disclosed and taught by the present invention.

REFERENCE NUMBERS ON THE DRAWING 1 packaged product
2 aseptic dairy beverage
3 cup
31 bottom wall
32 side wall
33 lid
34 top part of the side wall
35 bottom part of the side wall
4 headspace
41 headspace gas
5 bottle
51 lid

The invention claimed is:

1. A packaged product comprising an aseptic dairy beverage in a closed container, wherein the beverage does not contain soy protein and comprises: from 2 to 4 wt % of milk proteins, up to 4 wt % of milk fat, from 0.5 to 5 wt % of added sugar, from 0.35 to 0.65 wt % of cellulose, from 0.05 to 0.18 wt % of gellan gum, and the remainder to 100 wt % of water; the beverage has an apparent viscosity of 30 to 80 mPa·s at 4° C.; the headspace represents from 18 to 35 vol. % of the volume of the container; and the beverage has a shelf life of at least 6 months at 20° C.

2. The packaged product according to claim 1, wherein the beverage further comprises from 0.03 to 0.1 wt % of a buffering agent.

3. The packaged product according to claim 2, wherein the buffering agent is selected from the group consisting of potassium phosphate, dipotassium phosphate, potassium citrate, potassium bicarbonate, sodium bicarbonate, sodium citrate, sodium phosphate, disodium phosphate and combinations thereof.

4. The packaged product according to claim 1, wherein the beverage further comprises a flavour ingredient selected from the group consisting of coffee, cocoa, tea, caramel, vanilla, cinnamon, cardamom, saffron, clove, and mixtures thereof.

5. The packaged product according to claim 1, wherein the beverage further comprises a flavour ingredient comprising coffee extract.

6. The packaged product according to claim 1, wherein the beverage comprises from 0.5 to 1.5 wt % of coffee extract.

7. The packaged product according to claim 1, wherein the beverage is shelf-stable during at least 9 months at 20° C.

8. The packaged product according to claim 1, wherein the beverage retains a foamy texture during at least 10 minutes after shaking when prepared at a temperature between 4° C. and 30° C.

9. The packaged product according to claim 1, wherein the container is a cup or a bottle.

10. The packaged product according to claim 1, wherein the beverage does not contain rice protein, does not contain added oil and does not contain fermented milk.

11. The packaged product according to claim 1, wherein the beverage comprises skim milk, cream, and skim milk powder that provide the milk proteins and the milk fat.

12. The packaged product according to claim 1, wherein the milk fat is 0.8 to 3.54 wt. % of the beverage.

13. The packaged product according to claim 1, wherein the milk proteins are 2.0 to 3.0 wt. % of the beverage.

14. The packaged product according to claim 1, wherein the beverage contains less than 4.5 g of the added sugar per 100 g of the beverage.

15. The packaged product according to claim 1, wherein the beverage contains from 18 to 20 wt. % total solids.

16. The packaged product according to claim 1, wherein the headspace is 30 to 32 vol. % of the volume of the container.

* * * * *